Jan. 25, 1966 J. D. CAMPBELL III, ET AL 3,231,455
SURFACE DECORATED WOODEN ARTICLE AND PROCESS OF FORMING SAME
Filed June 1, 1962 8 Sheets-Sheet 4

Jan. 25, 1966    J. D. CAMPBELL III, ET AL    3,231,455
SURFACE DECORATED WOODEN ARTICLE AND PROCESS OF FORMING SAME
Filed June 1, 1962

Jan. 25, 1966   J. D. CAMPBELL III, ET AL   3,231,455
SURFACE DECORATED WOODEN ARTICLE AND PROCESS OF FORMING SAME
Filed June 1, 1962   8 Sheets-Sheet 8

United States Patent Office 3,231,455
Patented Jan. 25, 1966

1

3,231,455
SURFACE DECORATED WOODEN ARTICLE AND PROCESS OF FORMING SAME
James D. Campbell III, Newark, Del., Harold L. Hameister, Ilion, N.Y., and Ronald F. McConnell, Wilmington, Del., assignors to Remington Arms Company, Inc., Bridgeport, Conn., a corporation of Delaware
Filed June 1, 1962, Ser. No. 199,333
8 Claims. (Cl. 161—124)

This invention relates to a new type of decoration for the surface of wooden articles and to a new method of forming such decorations.

In the past it has been relatively common to cut or carve the surface of a wooden article so that portions thereof stood out in relief. For example, both for decorative and utilitarian purposes, it has been common practice to provide a checkered pattern of intersecting grooves in grip portions of gun stocks and similar articles. Such patterns were formed by cutting grooves in the surface of the wood, leaving small diamond or pyramidally shaped islands standing out in relief. Since the wood fibers were cut to either side of each of the diamond or pyramidally shaped islands, the preservation of the pattern depended upon the shear strength of the pyramids in planes parallel to the original surface of the wood, and it is not uncommon to find checkered gun stocks from which some of the pyramidally shaped islands have disappeared. With any design which has been rendered in fine detail a similar problem exists. As another example, the carving of articles of furniture to define scrolls, leaves, floral patterns and the like has been relatively common.

Further, since decorated wooden surfaces achieved by cutting the fibers of the wood depend upon hand or machine carving or routing to remove material defining the pattern, they are expensive methods and, if performed by machine, limited to a relatively small choice of patterns. Further, a change of patterns in mechanized work can generally only be achieved by substantially complete redesign of the machine. Examples of mechanized gun stock checkering are found in the patents to Seiler, No. 1,900,203; Hailston et al., No. 2,573,565; and McDonald et al., No. 2,638,946. Pantograph machines, which govern a cutting head from a tracer following a metallic or other pattern, have been widely used for producing carved decorative effects on furniture.

The principal objects of this invention are the production of more durable and decorative wooden articles, such as furniture, gun stocks and others, by methods which are both more economical and versatile.

A further object is the production of patterns which cannot reasonably be formed by any other method and which have an unusual decorative and utilitarian appeal.

We have discovered that when wood is heated to the proper degree the lignin and other natural resins serving to bind the wood fibers together becomes relatively plastic and that the wood fibers themselves are softened or rendered more flexible so that they may be deformed without breaking. Since the natural resins are apparently all thermoplastic a pattern molded in while the surface is still hot will be locked in by the hardening of the natural resins after the article has been cooled to normal temperatures.

To prevent the rupturing and cutting of the fibers there are limitations, which will be more fully set out in the specification, as to sharpness and height of features standing out in relief on the molded surface. The molded surface may contain impressions in much finer detail than may be practically achieved in those features standing out in relief. To achieve the finest of detail, optimum molding conditions must be quite closely adhered to.

We have noted that a recurrent pattern of fine straight line details, such as is commonly used for checkered surfaces of gun stocks, is one of the most difficult patterns to mold in natural wood, for any localized departure from perfection in molding becomes glaringly apparent when surrounded by areas of perfect molding. Since this type of pattern is the most difficult to produce, the specific examples illustrated herein and the process steps described herein are directed to the decoration of gun stocks.

We have found also that conventional wooden articles can be heated to a degree sufficient to achieve such plasticization of their surfaces without charring or discoloration providing the heating is done at a relatively high rate of speed and is not continued after the desired work has been achieved.

We believe the most satisfactory results are obtained by the use of a metallic die in the surface of which there is formed the negative image of the desired pattern. We prefer to heat the die to a degree sufficient to plasticize the natural resins in the wood and then apply it to the wood under pressure and at such a rate that plasticization is achieved and the wood molded without splitting or rupturing fibers, removing the die immediately after the desired impression has been obtained, to prevent charring or discoloration.

We have found that it is not desirable to add moisture and that the wood should preferably be quite dry, as more than 12% moisture by weight results in the development and entrapment of steam, which tends to rupture the pattern formed with a popcorn-like effect.

We have also found that care must be taken to facilitate the escape of such gases as are released in the process, for otherwise they may prevent the molding of the impression with complete fidelity to the dies.

The exact nature of the invention, as well as other objects and advantages thereof, will become more apparent from consideration of the following specification, referring to the attached drawings, in which.

Figure 6A:
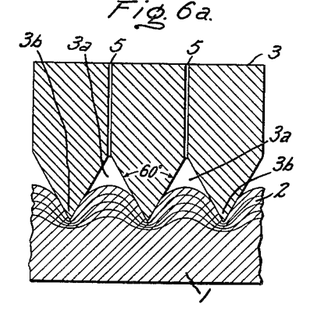
FIGS. 6a and 6b are schematic cross-sectional views illustrating the action of a die upon a wooden article to be decorated.
Figure 6B:
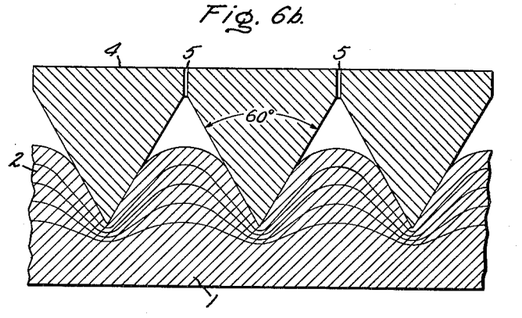

Referring particularly to the drawings, FIGS. 6a and 6b are seen to illustrate in cross-sectional form a wooden article 1 upon which a pattern of spaced parallel ridges and valleys is to be impressed. This wooden article can be considered to represent a bundle of cellulosic fibers 2, of which only a surface layer is shown, laid in substantially parallel form and bonded together with lignin and other natural thermoplastic resinous substances. When the material has been heated to the proper degree, the resinous binders become plastic and the cellulosic fibers become extensible and capable of being reshaped without breaking. As the binders are permitted to cool, the fibers are retained in the new position and the molded pattern becomes a relatively permanent feature of the surface. When only a surface layer of the wooden article is heated to the requisite degree for molding, the balance of the article remains rigid and serves to back up the plasticized area in which the pattern is being molded.

We have found that a desirable method of accomplishing the surface heating of the wooden article is to preheat the molding die to a degree sufficient to effect the necessary plasticization and then to apply that die to the surface of the wooden article with sufficient pressure to cause it to penetrate and mold the wood as fast as the conduction of heat effects the plasticization of the surface. Immediately after the molding has been achieved, the heated die should be removed, to prevent discoloration of the wood.

With black walnut wood of average density, such as is used for gun stocks and many articles of furniture for example, the dies may be heated to between 570° F. and 620° F. to effect such molding, but such heated dies should not remain in contact with the surface of the wooden article for more than about 6 seconds for substantial discoloration may appear and severe discoloration of the surface will appear in about 12 to 16 seconds. The time limits set above are for a single impression. If molding is achieved by multiple short time impressions, permitting some cooling between impressions, the aggregate permissible time is somewhat greater.

The rate of die entry into the wood is most desirably determined by the rate of softening or plasticization of the surface. Fairly obviously, if the die is forced to penetrate before the surface is plasticized there will be shearing, rupturing and crushing of the wood fibers, with a resulting poor pattern and rough surface condition, while too slow a rate permits too much heat to be transmitted and the wood will char before molding can be completed.

For the above purposes it will be seen that pneumatic or hydraulic force, which can be applied by variable displacement means at a pressure inadequate to crush the unplasticized surface but adequate to force the die into the wood as far as softening takes place, is ideal for our purposes. Averages pieces of black walnut wood for example will, in its unplasticized form, support pressures of about 1,000 p.s.i. when the pressure is applied to the side grain and about 6,000 p.s.i. when the pressure is applied to the end grain of the piece. These limits apply to the area actually contacted by the pressure applying means and may be scaled down to apply to small areas until the contacting areas approach cutting edges or piercing points. Obviously, in determining the allowable force with any particular die, consideration must be given to the reduction in initial contacting area resulting from surface features formed in the die as well as the increased contacting area as the die penetrates the wood. In this way the proper entry of the die is automatically determined at the maximum practicable rate as the wood softens and conforms to the die.

It was previously indicated that certain gases are released as a result of the heating of the wood and that means must be provided to prevent their escape. The entrapment of these gases is undesirable for two reasons. In the first place, if gases are entrapped in the bottom of a recess in the die, they will prevent the plasticized wooden surface from moving into that recess to conform to the surface of the die. In the second place, entrapment of gases results in at least some portion of the gas being retained within the pores of the wood and substantial internal pressure may be developed within the molded features. With the release of the die pressure, these gases try to expand and many instances have been noted where the expansion of such gases results in the virtual explosion of the molded feature in a fashion similar to the explosion of a grain of popcorn.

Several means are available for allowing the escape of gases which would otherwise be entrapped. One such method contemplates that the die will be brought into contact with the wooden article in a reciprocating cycle so that several impressions are required to complete molding of the pattern with gases escaping between cycles. Another method contemplates forming a pattern consisting largely of continuous lines in the surface of a cylindrical die which is rolled across the surface of the wooden article. In this case, gases escape tangentially along the surface of the cylindrical die, being aided in their passage to the escape point by the presence of the line defining grooves in the dies. The obvious reverse of the method just discussed is to roll a cylindrical wooden article across the surface of a flat die. A third method of providing for the escape of gas is to pierce the die with a multiplicity of small holes, placing the bottom of each depression in the die in communication with the atmosphere.

In FIG. 6a, a die 3 is formed to define a multiplicity of parallel grooves 3a separated by ridges 3b. From the bottom of each groove 3a gas vent holes 5 penetrate the die to permit entrapped gas to escape. With this die heated to a temperature between 570° F. and 620° F., force may be applied to it to apply to the surface of the wood localized unit pressures in excess of 1,000 p.s.i. when the die is applied to a side grain surface. As the wood softens, the ridges 3b of the die penetrate the surface of the wood to form grooves therein and some of the material displaced in the formation of the grooves bulges upward into the grooves 3a in the die. It is difficult to displace the wood sufficiently to completely fill the bottom of the grooves in the die and as a result the narrowest edge which can be formed on any feature of the raised detail in the molded pattern is usually rounded over at a radius of curvature between .002″ and .005″. Similarly, there is a limit to the height to which the features of raised detail in the molded pattern are raised above the surface of the depressed portion, for if the pattern is too fine or an attempt is made to raise it too high or to conform too exactly to the surface of the die, the whole surface may be simply crushed under pressure before molding is accomplished.

With greater spacing between adjacent lines in the die 4, as shown in FIG. 6b, the rigidity of the bundles of fibers 2 spanned by two adjacent ridges in the die is less and the material is more readily displaced after plasticization so that, in proportion, the die may be filled more completely and portions of the pattern indented more deeply with relation to those raised features of the pattern. As in FIG. 6a however the raised features will not readily be formed to define edges thinner than that defined by a radius of curvature of between .002″ and .005″. To the greatest extent possible it is desirable to minimize the flow of material in molding by designing the pattern so that areas of raised and lowered detail detail are closely adjacent to each other.

It is also desirable to form any raised feature of the die, which will form depressions in the wood, so that the face angle of the die provides sufficient cleavage to tend to displace fibers laterally, rather than to push them downwardly. The 60° face angle between the opposite sides defining the ridges in FIGS. 6a and 6b is nearly optimum. A 90° face angle in this location tends to cause an undue amount of compression of the wood fibers, and face angles much less than 60° tend to require that the die penetrate too deeply and remain in contact with the wood too long to provide optimum molding without overheating.

Particularly in molding regular repetitive feature patterns it is desirable not only to form the dies to facilitate as nearly as possible equal distribution between raised and depressed areas but to design the pattern to produce the greatest relief effect with a minimum amount of displacement of the wood.

Figure 7:
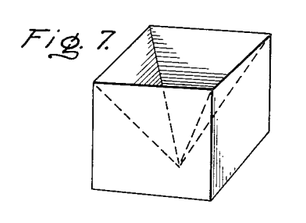
FIGS. 7, 8, 9 and 10, are perspective schematic views illustrating the effect of making impressions of various forms in the surface of a unit volume of a wooden article.
Figure 8:
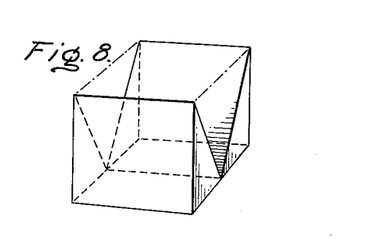
Figure 10:
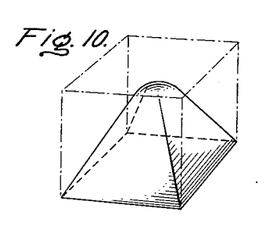

FIGS. 7, 8 and 10, each represent a unit cube taken from the surface of a wooden article into which a pattern is to be impressed and are of material which must be displaced to form the pattern.

In FIG. 7 the impression formed in the unit cube is that of a regular square pyramid. Knowing that the volume of such a pyramid is ⅓ of the product of the two sides of the base and the altitude, it is apparent that ⅓ of the volume of the unit cube must be displaced to form such a depressed pyramided impression. With average black walnut wood we have found a pressure of 1650 p.s.i. applied to each of such unit cubes will mold a satisfactory impression in a side grain surface.

In FIG. 8 the impression is that of an equiangular V groove which requires the displacement of 50% of the material of the unit cube to form. With average black walnut wood we have found that a pressure of about 2,100 p.s.i. applied to each unit cube will mold a satisfactory impression in a side grain surface.

In FIG. 10 the material of which the unit cube is formed has been displaced to leave only a regular square pyramid having the same volume as that of the material displaced in FIG. 7. Obviously, twice as much material or two thirds of the volume of the unit cube must be displaced to leave a pyramidal unit standing out in relief as to form a pyramidal depression. With average black walnut wood we have found that a pressure of about 2,500 p.s.i. applied to each unit cube will mold a satisfactory impression in a side grain surface. We have not found it practicable to produce molded patterns in this way if substantially more than two thirds of the material in any unit volume must be displaced.

Figure 9:
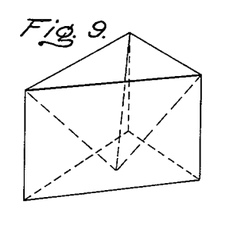

In FIG. 9 is a regular triangular pyramid has been impressed in a unit volume of triangular cross section and here also it will be apparent that only one third of the material of the unit volume had to be displaced to form the impression. The exemplary pressure discussed relative to FIG. 7 is also applicable to this type of impression.

Figure 1:
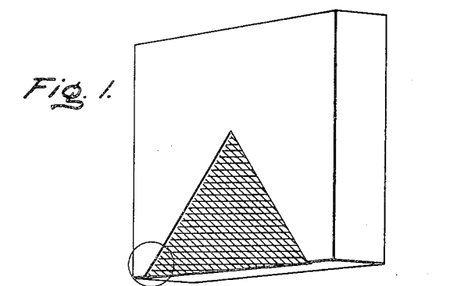
FIGS. 1 and 2 are perspective views of wooden panels in which there have been impressed patterns produced in accordance with the invention.
Figures 3, 4:
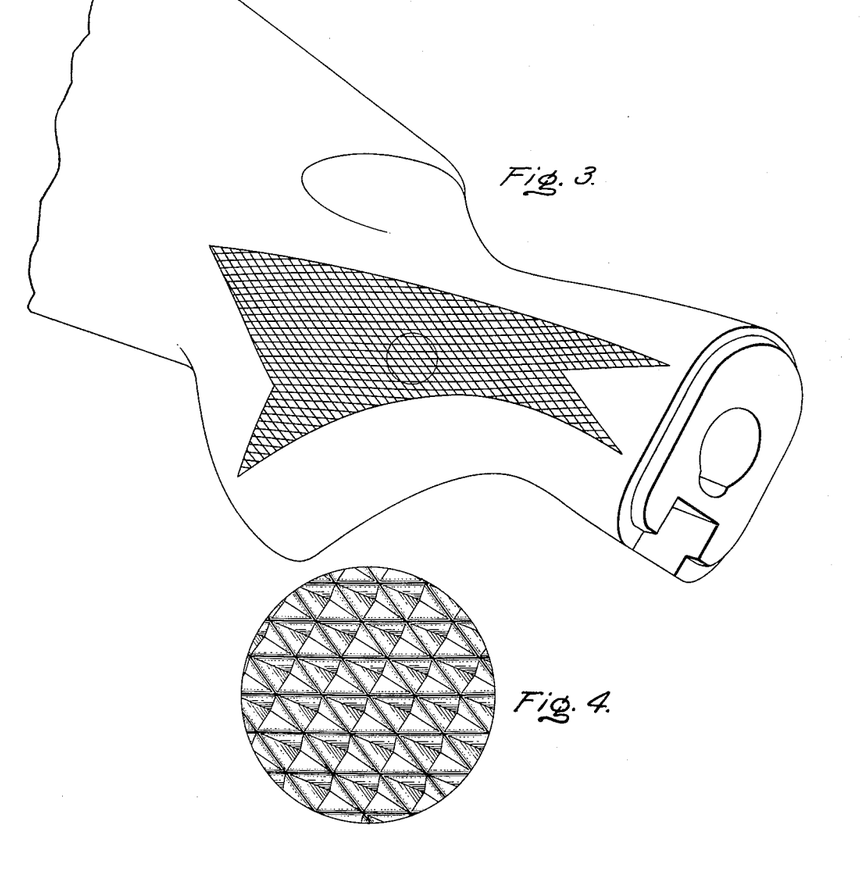
FIG. 3 is a perspective view of a portion of the buttstock of a firearm on which a checkered pattern according to the invention has been impressed.
FIG. 4 is an enlarged representation of the circular area set out in FIG. 3.
Figures 5, 5A:
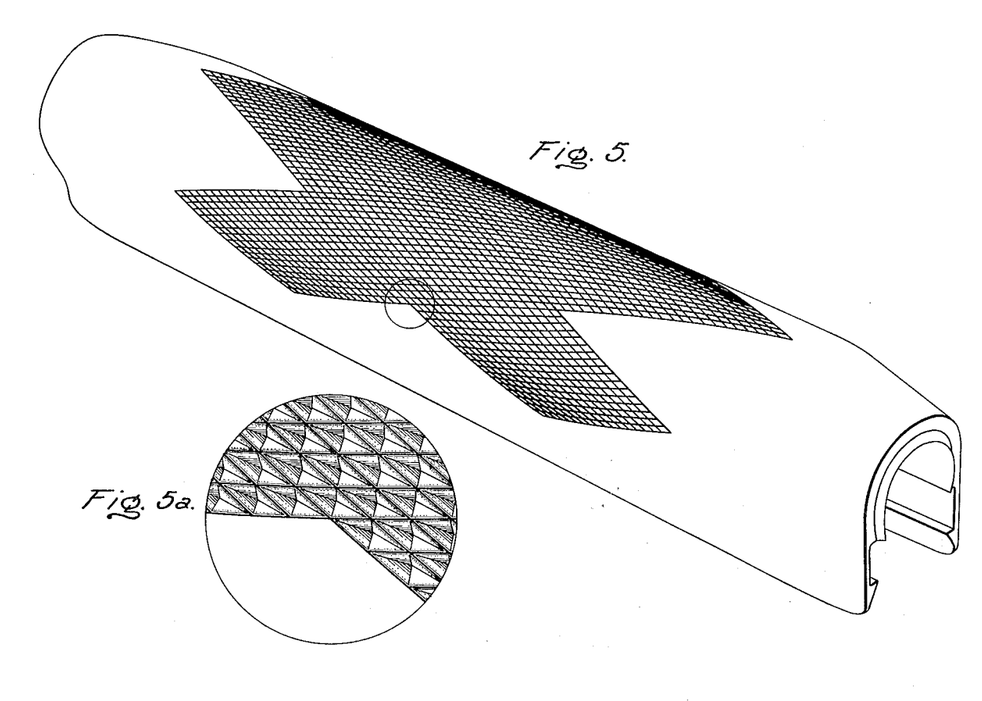
FIG. 5 is a similar view of a portion of a forestock of a firearm.
FIG. 5a is an enlarged representation of the circular area set out in FIG. 5.
Figure 11:
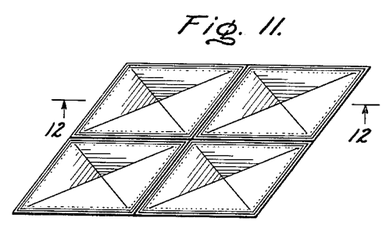
FIG. 11 is a plan view of four suitable unit impressions for decorating a gun stock, showing how they may be combined to form a pattern.

FIG. 11 is a plan view showing how unit pyramidal impressions can be combined into an overall checkered pattern of the type shown in FIGS. 1, 4 and 5. Attractive checkered patterns for use in decorating gun stocks may be formed in this way, provided the width across the least dimension (shortest diagonal) of the depressed areas does not exceed about .808″ and the face angles which define the sides of the depression are about 60°. In relating the .080″ dimension to gun stock checkering patterns, this represents about 12 lines per inch, which is coarser than ordinarily used. Patterns of from 18 to 24 lines per inch are far more attractive for gun stock use and are formed when the width across the least dimension of the depressed area is substantially less than .080″.

In addition to the appearance consideration, it is desirable to keep regular checkered patterns below the .080″ minimum width specified, for it can be seen that when the face angles are kept at or near the optimum 60° figure and the width dimension is made greater, the depth of the impression increases proportionately. This naturally requires that the die remain longer in contact with the wood to heat it to the necessary depth and may cause undesirable over-heating and possible discoloration of the wood.

Figure 1A:
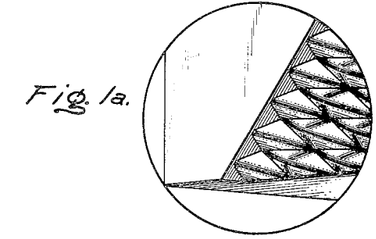
FIGS. 1a and 2a are enlarged representations of the circular areas shown in FIGS. 1 and 2.
Figure 2:
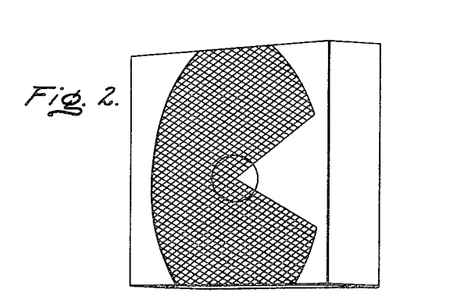
Figure 2A:
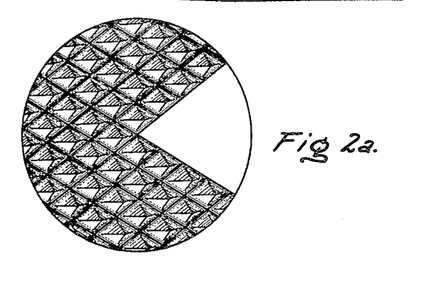

Patterns of the type shown in FIGS. 1 and 1a may be formed by the impression of a die in which discrete pyramidal pockets are formed in a regular pattern. When such a die is impressed into the wood the resultant impression is that of a regular pattern of spaced depressed lines separated by separate pyramidal units standing out in relief. Such a pattern is similar to the pattern produced by conventional gun stock checkering means where intersecting grooves are cut into the wooden surface, and such a pattern has some advantages from the standpoint of providing a non-slip gripping surface.

Patterns of the type shown in FIGS. 2, 2a, 3, 4, 5 and 5a, may be formed by the impression of a die, such as shown in FIGS. 18, 18a, 18b and 19, in which two sets of parallel 60° V grooves have been cut to intersect each other forming in the surface of the die a multiplicity of pyramidal units standing out in relief between the lines. When such a die is impressed into the wood the resulting impression is that of a regular pattern of intersecting raised lines each separated from the adjacent lines by depressed pyramidal impressions.

Figures 13, 14, 15:
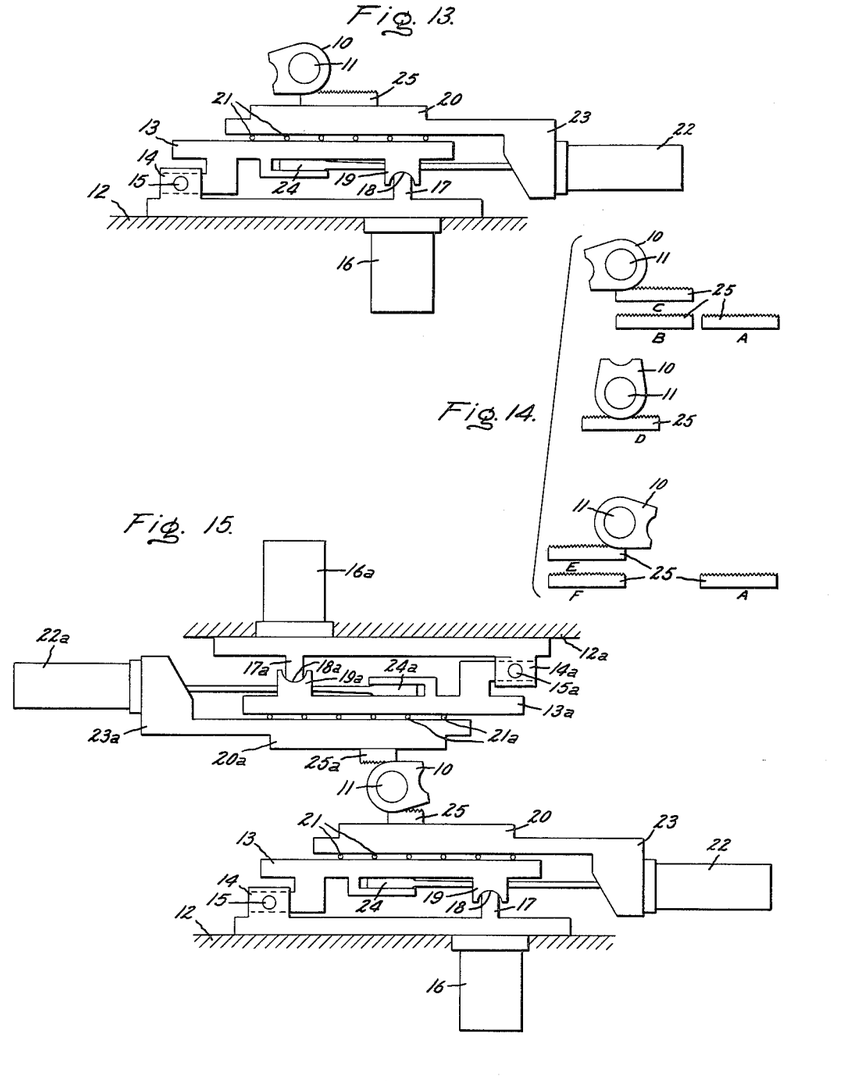
FIG. 13 is a schematic view illustrating a suitable mechanical embodiment of apparatus for applying a decorative pattern according to the invention.
FIG. 14 is a schematic view illustrating the sequence of operations of the apparatus shown in FIG. 13.
FIG. 15 is a schematic view illustrating an adaptation of the embodiments illustrated in FIGS. 13 and 14 to the simultaneous application of patterns on opposite sides of the same piece.
Figure 18:
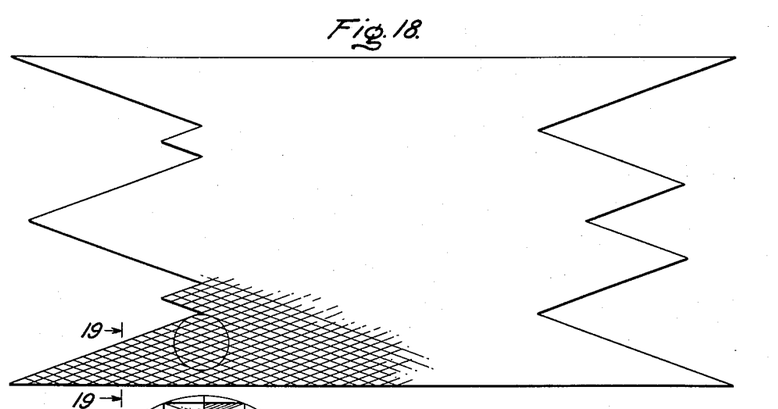
FIG. 18 is a top plan view of a suitable die for decorating a gun stock.

In FIG. 13, we have illustrated somewhat diagrammatically a machine by which a checkered pattern may be molded in the surface of a forestock such as that illustrated in FIG. 5 and utilizing a die such as that illustrated in FIG. 18. In this figure a blank forestock 10 is clamped on a mandrel 11 which is free to move in rotation but has no other freedom for movement. A base 12 from which the mandrel is rigidly supported also has mounted thereon a self-aligning table 13 supported by a universal trunnion 14 which has one axis of rotation indicated by circle 15 and another axis of rotation parallel to the plane of the drawing. A pair of hydraulic pressure cylinders 16 are mounted one behind the other on the base 12 and provided with piston rods 17 extending upwardly and terminating in ball ends 18 received in sockets 19 on the bottom of the table. The table assembly thus has a three-point support on one universal joint and two pressure cylinders and under the urging of the pressure cylinders is free to align itself in engagement with any resisting object.

A platen 20 is supported on the table 13 by a plurality of ball bearings 21 for sliding movement thereon and may be urged to said movement by a hydraulic die traverse cylinder 22 mounted on a downward extension 23 from the platen. The piston rod from cylinder 22 extends beneath the table 13 and is secured thereto by a ball bearing pivot joint 24. A heated die assembly 25 is mounted on the platen 20.

In use, actuation of the hydraulic cylinder 16 results in raising and lowering of the table 13 which swings about the universal joint 14 and actuation of the die traverse cylinder results in traversing the platen across the upper face of the table.

FIG. 14 is a diagram showing a suitable sequence of steps of movement of the die assembly 25 relative to the mandrel 11 and forestock 10 mounted thereon, such movement of the die assembly being produced by the actuation of the hydraulic cylinders as noted in the preceding paragraph. Any one of several known types of control apparatus may be used to actuate the cylinders at the desired time and sequence.

Position A of the die block is the normal rest or loading position, in which a forestock 10 may be placed on the mandrel. Actuation of the die traverse cylinder may cause the die to be moved to position B beneath the forestock where it is allowed to stop. At this point, actuation of the pressure cylinders 16 raises the die into engagement with the forestock 10 at position C and when the proper degree of pressure has been applied the die traverse cylinder 22 is again actuated to push the platen 20 across the table 13. From position C through D to E the die is traversed at a constant rate and the forestock, which is free to rotate about the axis of the mandrel 11, has the pattern impressed in the die molded into its surface. Throughout this portion of the cycle a constant pressure is maintained in the cylinders 16 and, since the table is universally mounted and the platen relatively free to seek its own sliding path on the table, the die will follow all reasonable variations in the geometry of the forestock. At position E, movement of the die traverse cylinder stops and the pressure cylinders 16 are actuated to retract the die downwardly to position F, where the die traverse cylinder is again actuated to return the die assembly to position A, where it stops until the impressed forestock has been removed and a fresh piece substituted.

In FIG. 15 it will be noted that the arrangement shown in FIG. 13 has essentially been duplicated with one unit upside down and the mandrel and forestock mounted between them. In this way the pressure cylinders work against each other, and requirements for rigidity of the mandrel support bearings are less critical. The same reference numerals have been applied to the lower unit of FIG. 15 as in FIG. 13. For the upper unit in FIG. 15, the same reference numerals have been applied with a subscript "*a*." Both units would follow the same sequence as outlined in FIG. 14 although the traversing movement between positions C and E is less extensive because each die now impresses only half of the pattern.

Figure 16:
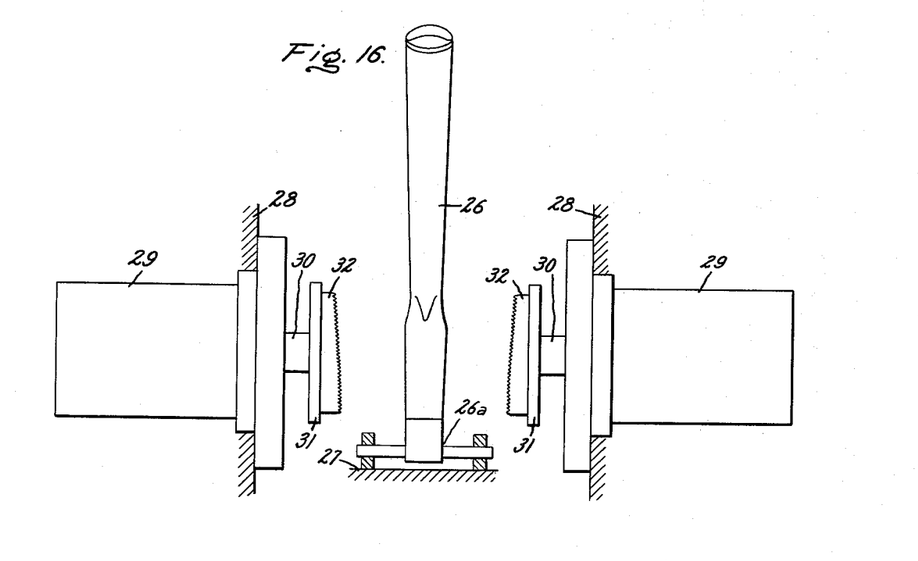
FIG. 16 is a schematic view illustrating a different embodiment for impressing patterns according to the invention.

FIG. 16 illustrates schematically a machine useful for producing a pattern such as that illustrated in FIGS. 3 and 4. Here a buttstock 26 is supported on a suitable fixture 26a which is mounted for limited longitudinal sliding movement relative to a base 27 between a pair of frame members 28 fixedly mounted relative to the base 27. Mounted on each of the frame members 28 is a hydraulic cylinder 29 provided with an inwardly extending piston rod 30 on which a die support platen 31 is secured. To each of the support platens there is secured a heated die 32. The two die platens reciprocate toward each other along a line parallel to the line of movement permitted by the sliding mounting of the fixture 26a on the base 27. Thus the buttstock 26 tends to center itself between the die platens and pressures are equalized. In regard to its features of major surface topography, each of the dies is a negative image of that portion of the buttstock in which the image is to be impressed. In regard to surface detail, the die surface is a negative impression of the pattern which is to be impressed in the buttstock. Thus, for a pattern of depressed pyramids separated by raised lines, the die surface is defined by an intersecting pattern of depressed lines separated by pyramids standing out in relief. For a pattern of raised pyramids separated by depressed lines, the die is formed with spaced pyramidal depressions separated by raised lines.

In the use of this arrangement, the hydraulic cylinders are simultaneously actuated, causing the platens 31 and dies 32 to move toward each other and to impress their patterns into the buttstock 26. If the dies are provided with perforations to permit the escape of gas, the pattern may be molded in a single stroke of the dies. It is generally preferable, however, with this arrangement to apply the dies in a sequence of several strokes, in each of which the dies remain in contact with the wood for periods of about one second or less. In this way, the gases and steam evolved from the wood are permitted to escape during the intervals that the dies are retracted. Since the stock is supported with capability for movement only along a line parallel to the reciprocation of the dies and the dies are constrained to move in straight reciprocation, the impressions formed by successive strokes of the dies are in registry and the patterns are simply deepened with each operation. Preferably limit stops will be provided to limit the degree of advance of the dies.

Figure 17A:
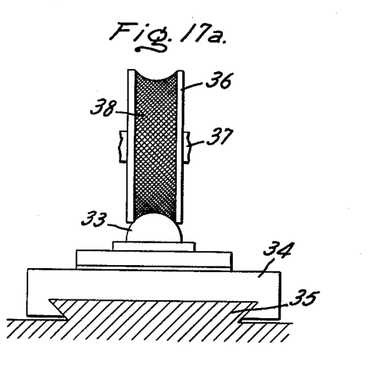
FIGS. 17a and 17b are schematic views illustrating another embodiment for impressing patterns according to the invention.
Figure 17B:
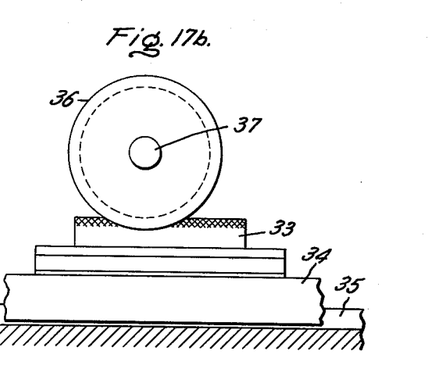

In FIGS. 17a and 17b we have illustrated an arrangement for rolling a pattern into the surface of a wooden member 33 rigidly supported on a traversing table 34 which can be moved over a base 35. A heated roller 36 is rotatably mounted on an axle 37 which is rigidly supported with respect to the base 35. The peripheral surface of the roller 36 is formed so that its major surface contours are a negative of the cross section of the piece in which a pattern is to be impressed and thus surface 38 of the die is formed with a pattern which forms a negative impression of the pattern to be impressed in the wooden member 33. Obviously, so long as the die is formed in a negative image of the member to be decorated and the cross section is relatively constant, the surface to be decorated may be flat, concave, convex, or some combination of curved and flat surfaces. Also the positions of die and article to be impressed may be reversed. In the most practical arrangement, the table 34 carrying the wooden article to be decorated is traversed beneath the rotatably supported die which is caused to rotate by frictional engagement with the article to be decorated. The gases evolved escape tangentially as the work passes beneath the die.

Figure 18A:
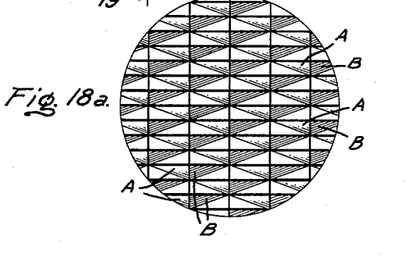
FIGS. 18a and 18b are enlargements in progressively greater magnification illustrating portions of the die shown in FIG. 18.
Figure 18B:
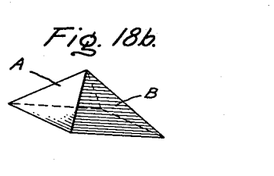
Figure 19:
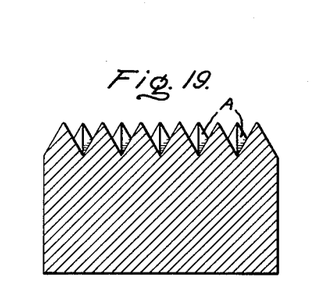
FIG. 19 is a partial longitudinal sectional view on the line 19—19 of FIG. 18.

In FIG. 18 we have illustrated the surface of a die which in its major topography is flat and intended for use in a machine such as shown in FIG. 13, to produce a pattern on a generally cylindrical article such as the forestock shown in FIG. 5. The molding surface of the die is defined by a set of intersecting equiangular V-grooves which, as seen in more detail in FIGS. 18, 18a, 18b and 19, leave a pattern of elongated pyramids standing out in relief. FIG. 18a shows an enlarged view of the circled portion of FIG. 18, and FIG. 18b shows a greatly enlarged perspective view of a single one of such pyramids. FIG. 19 is a cross-sectional view at right angles to one of the sets of spaced V-grooves which define the pattern. As previously noted, such a die will impress in the surface a pattern of depressed pyramids separated by spaced parallel lines which are substantially in the original plane of the wooden surface and do this with a displacement of only about one third of the volume of the unit blocks which make up each unit of the pattern.

Figure 20:
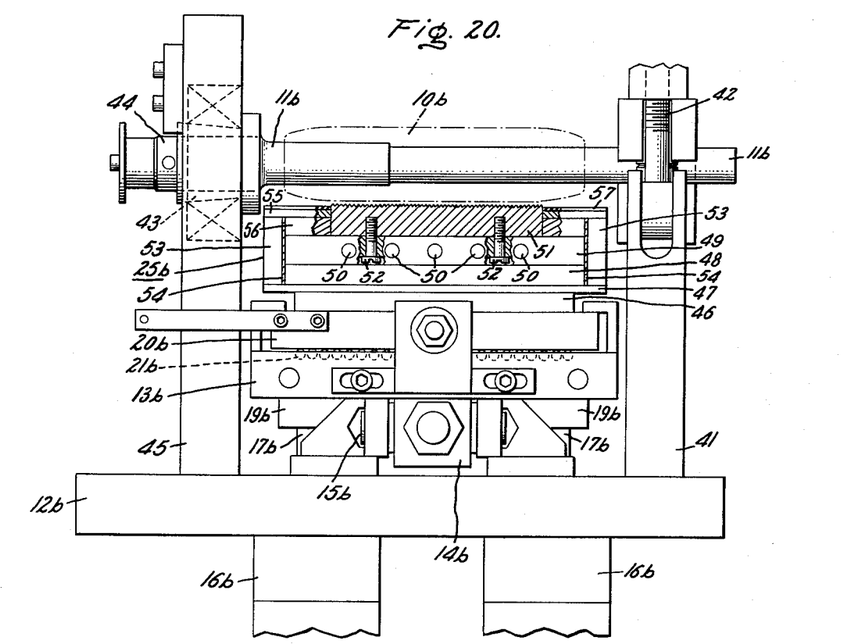
FIG. 20 is an end view of a practical embodiment of the apparatus illustrated schematically in FIG. 13.

In FIG. 20 we have illustrated in an elevational view the principal elements of a production unit corresponding generally to that shown in a schematic side elevational view in FIG. 13. Where the parts are for all practical purposes equivalents of the same parts as those identified in FIG. 13 we have applied the same reference numerals followed by the letter "*b*."

Figure 21:
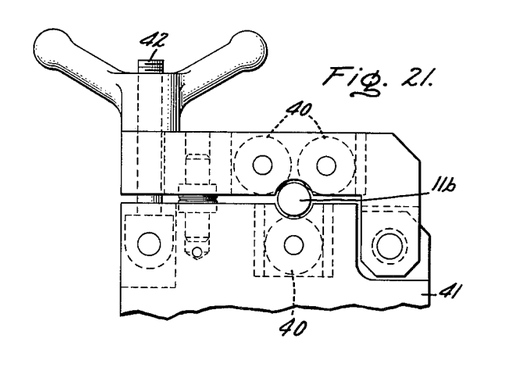
FIG. 21 is a partial side view of the apparatus illustrated in FIG. 20.

It will be seen that the mandrel 11b is rotatably supported at one end in a cluster of rollers 40 which are mounted in the top of a stanchion 41 mounted on the base 12b. As shown in FIG. 21 the top of this stanchion is capable of being opened by releasing the clamp screw 42 to permit free access to that end of the mandrel. The other end of mandrel 11b is mounted in a bearing 43 which permits rotation of the mandrel while thrust collars 44 limit endwise movement of the mandrel. That portion of the stanchion 45 in which bearing 43 is mounted is arranged to permit the arbor to be swung in an upward arc after the clamp screw 42 has freed the other end, to facilitate the removal and replacement of the articles to be decorated.

The arrangements for raising and lowering the table 13b with the cylinders 16b and for traversing the platen 20b which is carried on the ball bearings 21b are substantially the same as those illustrated schematically in FIG. 13.

The die assembly 25b mounted on the platen 20b shows one of the convenient ways for supplying sufficient heat to the die without objectionable, and indeed dangerous, transfer of heat to the platen and other elements.

A cooling plate 46 is secured directly to the platen and provided with torturous passages through which water or other cooling fluid can be circulated. Preferably this plate is of aluminum or other good conductor of heat. An aluminum plate 47 is secured to the plate 46 and on it there is supported a block 48 of a ceramic or other suitable rigid heat-insulating material which in its turn supports a heating plate 49 in which electric heating elements 50 are embedded. The die block 51 is directly secured by screws 52 to the heating plate 49.

The die block 51, heating plate 49, and the insulating block 48 are positioned laterally and held down on the aluminum plate 47 by an aluminum side frame 53 which laterally encloses the heated members and is separated from them by a thin layer 54 of insulating material. This side frame is made integral with or secured in mechanical and heat conducting relationship with the plate 47 and has secured to its upper edge a cover plate 55 and a spacer plate 56 which overlie the heating plate and are cut out to allow die block 51 to project from the upper face. Preferably the cover plate 55 is overlaid around the die block with a sheet 57 of a hard silicone rubber material which provides a somewhat insulated non-sticky surface to bear on the wooden article in which the pattern is being impressed outside the boundary of the pattern and limit the depth of the impression created.

By means of cover plate 55, side frame 53 and plate 47, the die block is not only secured in place, but waste heat, escaping from areas other than that actually used for the pattern impressions, is conducted back down to cooling plate 46.

Except for the added detail supplied above, with respect to the quick release means for removing a decorated forestock and replacing it with a blank and the added detail on the heated die assembly, the operation of the mechanism shown in FIG. 21 conforms strictly to that shown and described relative to FIG. 13. Obviously, similar arrangements can and should be adopted for heating the other forms of dies disclosed here which reciprocate into or roll across the surface being decorated.

Figure 12:
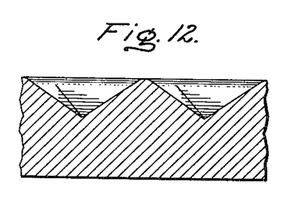
FIG. 12 is a cross-sectional view in the plane 12—12 of FIG. 11.

A series of tests were conducted, results tabulated below, in an effort to identify some of the more critical performance factors influencing the process. In each test a reciprocating die operator conforming generally to one side of the arrangement shown in FIG. 16 was used. The pressure was applied to the side grain of the wood and the die was similar to that shown in FIGS. 18, 18a, 18b and 19, producing impressions displacing one third of the material contacted, as in FIGS. 7, 11 and 12.

TEST # 1
*Variable, die temperature*

In this test the maximum pressure was held constant at 1650 p.s.i. over the area of die contact and the feed of hydraulic fluid to the pressure cylinder acting on the die was adjusted to a maximum rate of 1.32 inches per minute

| Sample | Die temperature, °F. | Result |
|---|---|---|
| A | Room | Barely marked by the points of high spots in die. |
| B | 225 | Shallow indentations by all elements of die. |
| C | 400 | Pattern completely formed but evidence of crushing and splitting of fibers. |
| D | 500 | See C above. |
| E | 550 | See C above. |
| F | 600 | Pattern well formed. No evident crushing or shearing of fibers. No discoloration appreciable. |
| G | 650 | Pattern well formed. Some darkening. |

From this and other tests, we conclude that for black walnut an optimum temperature is between about 570° F. and 620° F.

TEST # 2
*Variable, die entry rate*

In this test the die temperature was held constant at an optimum 600° F., and the maximum pressure was held constant at 1650 p.s.i. over the checkered area. The feed of the hydraulic fluid to the pressure cylinder was adjusted to produce the noted maximum die entry rate or rate of approach of the die to the work:

| Sample | Die entry rate | Result |
|---|---|---|
| H | .74″/min | Pattern well formed. Considerable discoloration. |
| F | 1.32″/min | Pattern well formed. No evident crushing or shearing of fibers. No appreciable discoloration. |
| I | 2.8″/min | Pattern well formed. Slight fiber separation. |
| J | 4.7″/min | Do. |
| K | 6.3″/min | Pattern well formed. Considerable fiber separation in boundary areas. |
| L | 8.1″/min | Do. |

From this and other tests, we conclude that for black walnut an optimum die entry rate is about 1.32 inches per minute, and that useful results will be attained if the die entry rate is maintained between about 1 inch per minute and about 5 inches per minute.

TEST #3
*Variable, time of contact of die with wood*

In this test the die temperature was held constant at 600° F., and the die entry rate was adjusted to 1.32 inches per minute. The maximum pressure was 1650 p.s.i. over the checkered area but positive steps were utilized to limit the maximum extent of die penetration:

| Sample | Time in contact, sec. | Result |
|---|---|---|
| M | 2 | No discoloration. |
| F | 4 | No appreciable discoloration. |
| N | 6 | Slight discoloration. |
| O | 12 | Considerable discoloration. |
| P | 16 | Quite dark but no evident charring. |

From this and other tests, we conclude that with black walnut the dies should not be left in contact with the wood more than about 5 seconds unless some darkening can be tolerated. With certain types of patterns the darkening which is incidental to the use of higher than optimum temperatures or to leaving the dies in contact with the wood too long is not an unattractive effect and may be regarded as enhancing the appearance of the finished product. The molding of any pattern which has been moderately overheated assumes a sharper cleaner character and certain surfaces assume a somewhat glazed or shiny appearance, which to some eyes is quite attractive.

The specific examples set forth above all apply particularly to black walnut of average gun stock grade. Similar results may be achieved with other woods such as maple which is sometimes used for gun stocks and, by modest variation in process parameters, are applicable to any other woods used for gun stocks or cabinetry.

Since the above examples are considered to be illustrative, rather than limiting, reference should be made to the appended claims for a definition of the limits upon our invention.

The term "a severe weather test" as used in certain of the appended claims shall be understood to mean a severe test conducted in apparatus of the character sold by Atlas Electric Devices Company under the name or mark "Weather-Ometer" and a form of which is described in U.S. patent to Clarence W. Jameson No. 1,870,512, issued August 9, 1932. This apparatus is well recognized by governmental and industrial agencies as standard equipment adapted to subject articles to severe weather conditions involving high temperatures and the simulation of a heavy rain. The Standards of the American Society for Testing Materials, specifically ASTM E42–64 and ASTM D–822–60 appearing respectively in Part 30 and in Part 21 of ASTM Standards 1964 establish such recognition.

The apparatus is connected into an electrical line having a 230 volt, 60 cycle, 3 phase current supply. A Class D instrument as defined in the Standards above referred to involves a drum about 30 inches in diameter and approximately 18 inches in height mounted for rotation about a vertical axis, which is the longitudinal axis of the drum about which the latter is rotated. Adjacent said vertical axis, but spaced laterally in relation to each other, there are mounted two powerful arc lamps, of the character designated Sunshine Carbon Arc Lamps, which when energized by current from the source of supply serve to simulate direct sunlight of intensity equivalent to noon June conditions on a clear day. These arc lamps generate considerable heat, so that temperatures during the test here involved range up to 120° F., even with the constant spraying of water. The rays of light developed by the arc lamps are directed radially outward toward the cylindrical wall of the drum. In the path of such light rays there are suspended for rotation with the drum, by suitable wire connections, the articles to be subjected to the test. The articles so suspended have their molded designed surfaces disposed perpendicularly to radial lines extending from the vertical axis of the drum, and they are carried around by the drum in a region adjacent the cylindrical wall of the same. Spray nozzles are also provided within the drum, these being supplied with water adapted to be discharged under a pressure of between 12 and 18 lbs./sq. in. and being adapted to generate a spray amounting to between 4.4 and 5.2 pints per minute. This is comparable with a heavy rain condition. The speed of revolution of the drum is 1 r.p.m., so that the articles being subjected to the test may readily be observed as the test proceeds. The nozzles extend radially outwardly from the vertical axis of the drum to the extent of 11 9/16 inches. They are provided with discharge outlets of a 60° conical form and thus provide a spray region of about 4 inches in width in the path of movement of the designed surface of the article being tested. Four of such nozzles are provided in the apparatus, spaced vertically at 3 5/8 inches apart in a vertical direction. However in the conduct of the test only that nozzle which is most closely alined radially in relation to the center of the design on the article being tested impinged its spray on the specimen. It will be seen from the foregoing that the spray of water will be applied to each region of the design of the article for only 4 inches of travel of such region in a single revolution of the revolving carrier drum. But this has been found sufficient to maintain a deposit of droplets of water on the surface of the design, and the humidity of the surrounding atmosphere is maintained at about 100%.

In the use of this apparatus to produce the "severe weather test" contemplated by the term used in certain of the claims the operating conditions were as specified for a type D unit in the ASTM Standards above referred to, and the operating cycle was adjusted so that both the carbon arc lamps and the spray nozzles were operated continuously throughout the test which was conducted for a period of four hours. This represents the most severe weather conditions to which articles within the drum may be subjected throughout the period of the test. The temperature and water spray conditions to which the articles within the drum are thus subjected are more serious and severe than ever likely to be encountered in the most severe tropical rainstorm conditions.

While the foregoing test for 4 hours in a Weather-Ometer may not be comparable with a severe weather test in certain regions over a long period of time, it positively establishes the great superiority of products of the present invention over products produced in accordance with the prior art. It is highly indicative of the *achievement of success of the invention, in contrast with the failure of the prior art*, in providing a product having the desired stability of a molded or impressed design under adverse weather conditions.

We claim:

1. A process of producing a densified permanently shaped decorative surface on a wooden article having any grain orientation, which comprises the steps of
    (I) Heating a metallic die, formed in negative image of the decorative surface to be produced, to a temperature between 570° F. and 620° F. to plasticize the naturally present thermoplastic resin content of the surface layer of the wood to a depth as great as that of any impression in the die
    (II) Applying said die to the surface of the wooden article to be decorated at a time when the moisture content thereof is less than 12% by weight and the wooden article is free from additions of plastic impregnants with pressure sufficient to impress any raised areas of the heated die into the wooden article to a depth substantially equal to the depth of any of the impressions in the die
    (III) Permitting gases released from the surface of the wooden article during pressure application to escape from the die without substantial confinement
    (IV) Withdrawing said dies as soon as the desired penetration has been achieved to avoid substantial discoloration of the surface of the wooden article.

2. A process as defined in claim 1, for applying a checkered pattern to a curved surface of a wooden article, said die being substantially flat and being applied to said wooden article by pressing it against said article while said article is rolled across the flat surface of said die, said gases escaping tangentially to either side of the line of rolling contact.

3. A process as defined in claim 1, for simultaneously applying a checkered pattern to opposite portions of a wooden article by supporting the wooden article between a pair of substantially flat heated dies, urging the heated dies toward each other and into impressing engagement with the wooden article, and rolling the wooden article between the dies while in impressing engagement therewith.

4. A process as defined in claim 1, wherein the negative image of the pattern to be produced is formed in the outer periphery of a wheel-shaped heated die, said application of the heated die to the surface of the wooden article being effected by pressing the outer periphery of the wheel-shaped die into the wooden article and then rolling the die across the surface of the wooden article while the die and wooden article are in pressing engagement.

5. A process of producing a densified, permanently shaped decorative surface on a wooden article having any grain orientation, which comprises the steps of
    (I) Heating a die, formed in the negative image of the decorative surface to be produced, to a temperature between 570° F. and 620° F. sufficient to plasticize the naturally present resins and other naturally present binders in the surface layers of the wooden article to a depth as great as that of any impression in the die;

(II) Applying said die to the surface of the wooden article to be decorated at a time when the moisture content thereof is less than 12% by weight and the wooden article is free from additions of plastic impregnants with pressure sufficient to impress any raised areas of the die into the surface of the wooden article to a depth substantially equal to the depth of any of the impressions in the die;

(III) Maintaining fluid pressure on said dies sufficient to cause said dies to enter into the surface of the wooden article at a rate of entry of between 1.0 inch per minute and 4.9 inches per minute, whereby the surface of the wooden article is plasticized to permit the raised areas of the dies to penetrate without splitting the wooden article or substantially severing the wood fibers thereof;

(IV) Permitting gases, released from the surface of the wooden article during pressure application, to escape from the die without substantial confinement;

(V) Withdrawing said dies as soon as the desired penetration has been achieved, to avoid substantial discoloration of the surface of the wooden article.

6. In a wooden article comprising a plurality of substantially continuous wood fibers which are generally parallel to each other and to the decorated outside surface of the article, an improved decorated molded surface formed of a surface layer of densified and deformed but substantially unbroken fibers of and integral with the wooden article bonded only by those resinous binders naturally present in the wooden article, said molded surface being defined by permanently densified and deformed areas that are locked in by said naturally present resinous binders which have been modified by heating at a temperature in the range between 570° and 620° F. to render the same stable in shape and dimensions during extended exposure to moisture and adverse weather conditions, said stability in shape and dimensions being such that no discernible difference occurs as a result of subjecting the article to a severe weather test, the surface fibers being denser and closer together than the fibers in the non-decorated portion of the article, said surface fibers remaining substantially unbroken and generally following the contours of the decorated surface, the fibers at greater distances beneath the decorated molded surface than the depth of any depression therein being substantially undistorted and generally parallel to each other and to the outside surface of the wooden article.

7. In a wooden article comprising a plurality of substantially continuous wood fibers which are generally parallel to each other and to the decorated outside surface of the article, an improved decorative checkered surface formed of a surface layer of densified and deformed but substantially unbroken fibers of and integral with the wooden article bonded only by those resinous binders naturally present in the wooden article, said checkered surface being defined by permanently densified and deformed areas that are locked in by said naturally present resinous binders which have been modified by heating at a temperature in a range between 570° and 620° F. to render said areas stable in shape and dimensions during extended exposure to moisture and adverse weather conditions, said stability in shape and dimensions being such that no discernible difference occurs as a result of subjecting the article to a severe weather test, the surface fibers being denser and closer together than the fibers in the non-decorated portion of the article, which deformed areas are spaced from areas from which the fibers have been laterally and vertically displaced into the deformed areas, said surface fibers remaining substantially unbroken throughout the extent of the decorated portion of the article and generally following the contours of the decorated surface, the fibers at substantially greater distances beneath the checkered surface than the depth of any depression therein being substantially undistorted and generally parallel to each other and to the outside surface of the wooden article.

8. In a wooden article as defined in claim 7, each of said areas from which the fibers have been displaced being in the form of the negative image of a pyramid with its apex depressed substantially below the original wooden surface, each of said areas from which the fibers have been displaced being separated from the adjacent areas from which the fibers have been displaced by intersecting straight lines which are not substantially depressed below the original wooden surface, which straight lines contain the displaced fibers, the distance between the intersecting straight lines which are not substantially depressed below the original wooden surface, measured across the least dimension spanning the deepest portion of the areas from which the fibers have been displaced, being not more than about .080 inch to define a checkered pattern not coarser than about 12 lines per inch, the included angle defined between opposite sides of the depressed pyramids being substantially equal to the angle included between the surfaces defining the lines which are not substantially depressed.

References Cited by the Examiner

UNITED STATES PATENTS

| | | | |
|---|---|---|---|
| 1,899,411 | 2/1933 | Fletcher | 144—328 XR |
| 2,017,037 | 10/1935 | Brown | 41—25 XR |
| 2,695,857 | 11/1954 | Lewis et al. | |
| 2,701,930 | 2/1955 | Dolan | 41—24 |
| 2,708,296 | 5/1955 | Soehner | 20—89 |

ALEXANDER WYMAN, *Primary Examiner.*

EARL M. BERGERT, *Examiner.*